March 27, 1934.   E. B. HUNTER   1,952,593
GLASS MAKING MACHINE
Filed March 14, 1932   2 Sheets-Sheet 1
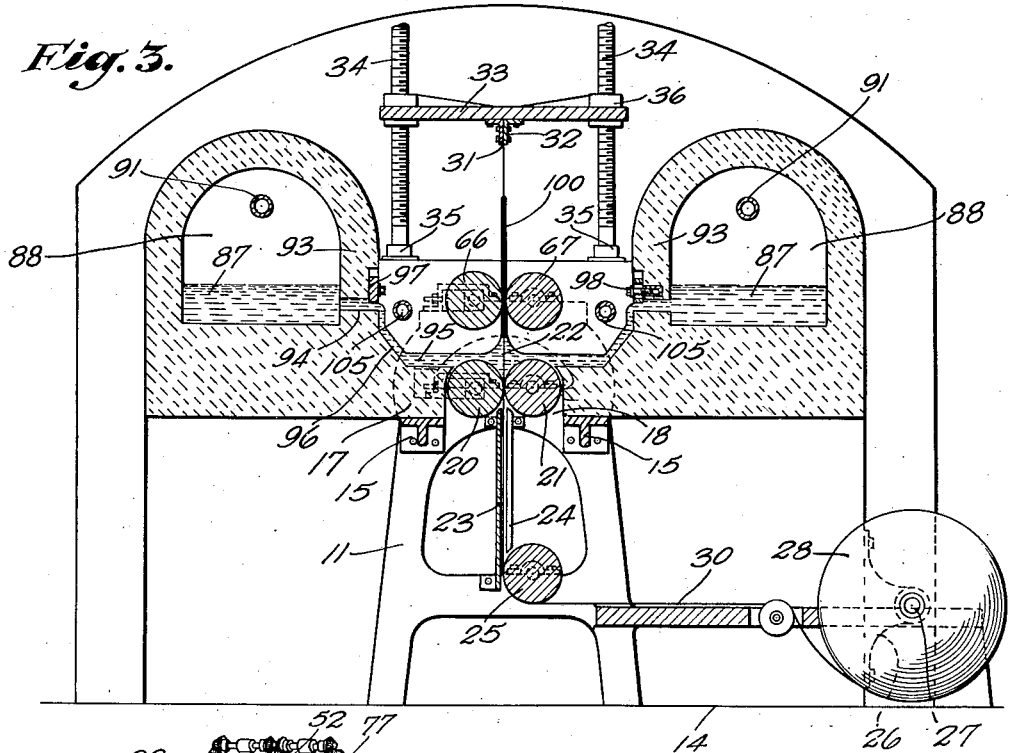
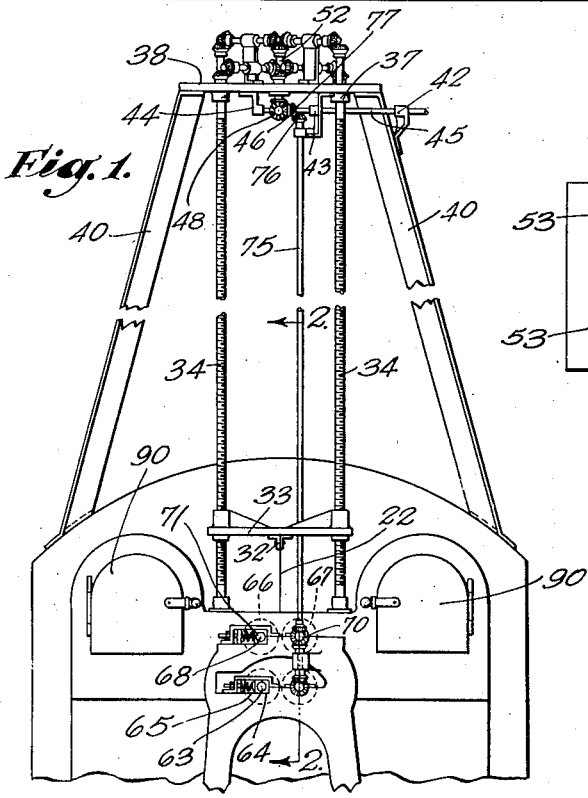
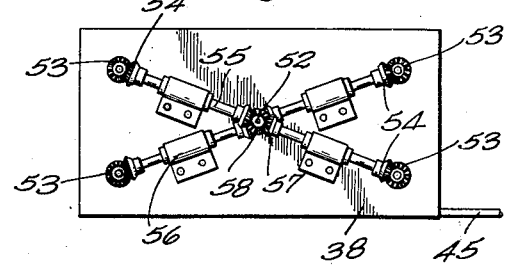
INVENTOR:
EDWARD B. HUNTER,
By
ATTORNEY.

Patented Mar. 27, 1934

1,952,593

UNITED STATES PATENT OFFICE 1,952,593

GLASS MAKING MACHINE

Edward B. Hunter, Los Angeles, Calif.

Application March 14, 1932, Serial No. 598,683

9 Claims. (Cl. 49—32)

My invention relates to a device for making sheet glass having strands of reinforcing material such as wire centrally embedded therein for the purpose of producing a glass sheet of substantially shatter-proof characteristic.

It is a principal object of my invention to provide a machine by which reinforced sheet glass of high quality may be economically manufactured. The present commonly employed method of making sheet glass with a wire fabric therein is to spread a sheet of plastic or molten glass over a table, place a wire fabric thereon, and then spread a top layer of molten glass over the fabric, the two glass layers uniting to form a single sheet or plate of glass having the wire reinforcement therein. Under ordinary circumstances the reinforced plate of glass thus formed must be polished in the customary manner of polishing plate glass. I am aware that there are a number of patents in existence showing machines for making reinforced glass in which a wire fabric is conducted into a body of molten glass and is then raised or lifted from the glass in a vertical plane so as to carry part of the molten glass therewith. I do not know that such devices have ever been practically used, and believe that the reason why they have not been placed in practical use is that the wire fabric is kept in the molten metal, or in engagement with extremely hot glass for too long a period of time with the result that the wires of the wire fabric are burned or oxidized.

It is an object of my invention to provide a glass making machine of the above character in which a wire fabric or reinforcing wires are carried through an upright plane, and as these wires or wire fabric moves upwardly layers of plastic or molten glass are directed to the opposite sides thereof.

The layers of plastic glass combine to form a sheet or plate of glass adhering to and embodying the reinforcing wires or wire fabric. The layers of plastic or molten glass are delivered to the opposite sides of the reinforcement, over the top of a horizontal structure or table and reach the position at which they are to combine to form a glass plate in such condition and at such proper temperature that burning of the reinforcement wires does not result.

It is an object of my invention to provide a glass making machine of the above character having a horizontal or table structure with an opening therein, there being means for guiding a wire fabric, or reinforcing wires upwardly through this opening, and a vertically movable carriage or head for engaging the upper ends of the wires and moving them upwardly at a controlled rate of speed. At the sides of the horizontal or table structure are channel or trough-like containers which receive molten glass from a glass furnace and which are adapted to discharge layers of glass across the top of the table structure to the upright plane or path through which the reinforcing wires are moved upwardly.

It is a further object of the invention to provide a device of the character set forth in the foregoing paragraph having parallel rollers in the opening of the horizontal wall, which rollers provide a closure for the opening, and also serve as guide means for the reinforcing wires.

It is a further object of the invention to provide such a glass making device having means above the opening in the horizontal wall structure which may be applied to the opposite sides of the upwardly moving sheet of glass for the purpose of forcing the layers of glass toward each other, for gauging the thickness of the glass plate, or for imprinting one or both surfaces of the plate to render the plate of glass non-transparent.

It is a further object of the invention to provide a glass making machine of the above character which may be employed to make any kind of flat glass, either with or without reinforcement and with either smooth or figured surfaces.

Further objects and advantages of the invention will be brought out in the following part of the specification.

Referring to the drawings which are for illustrative purposes only,

Fig. 1 is a front elevation of a simple preferred form of my invention.

Fig. 3 is a cross-section on a plane represented by the line 3—3 of Fig. 2.

Fig. 4 is a plan view showing the drive gear arrangement at the upper end of Fig. 1.

Figure 2:
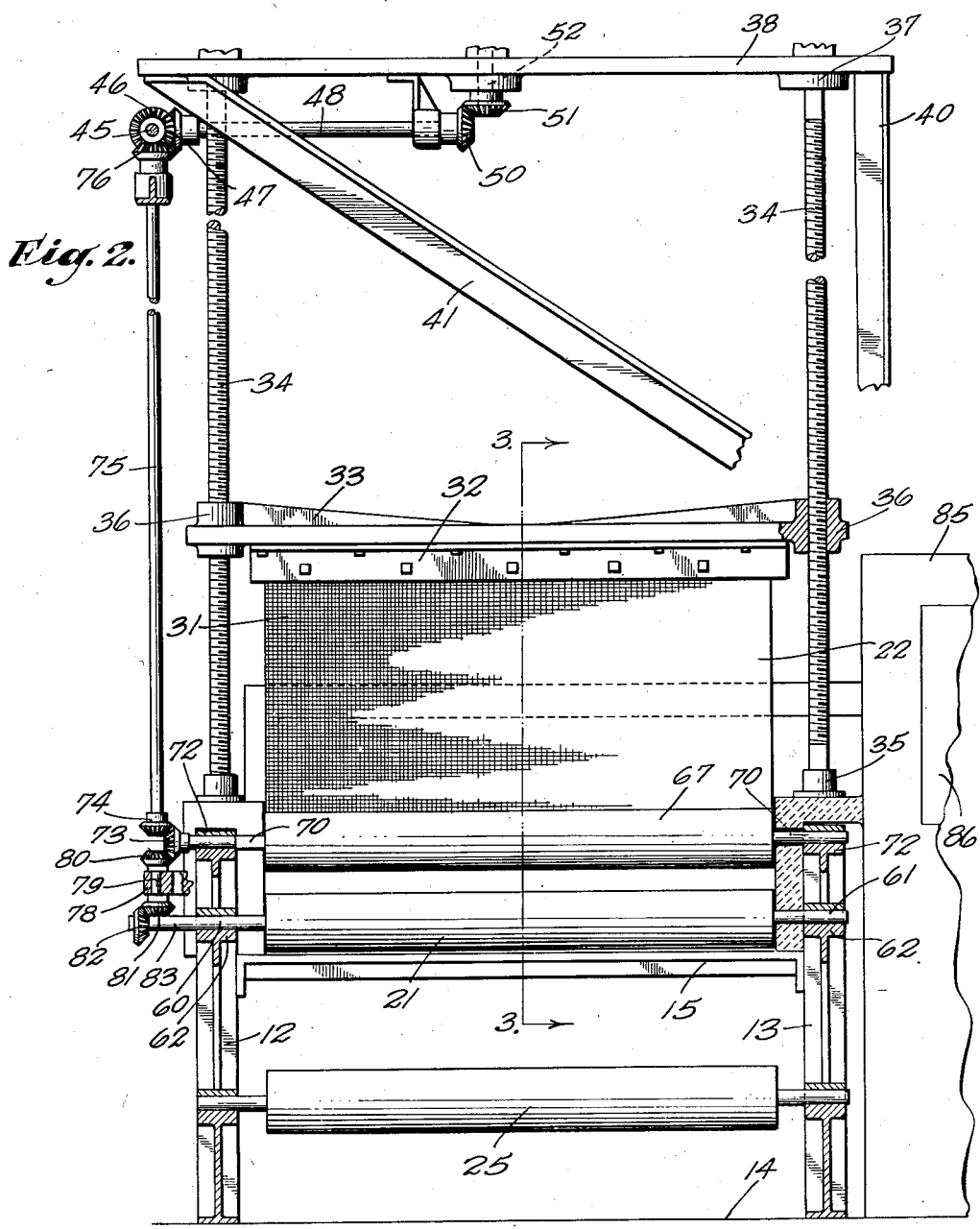
Fig. 2 is an enlarged cross-section on a plane represented by the line 2—2 of Fig. 1.

As shown in the drawings, my new glass making machine employs a frame structure 11 including end members 12 and 13 secured to a floor or base 14 and connected together by means of horizontal members 15. Supported on the members 15 of the frame structure 11 is a horizontal wall 17 having a vertical opening 18 therein in which parallel longitudinal rollers 20 and 21 are mounted, the rollers 20 and 21 being of a size to substantially fill the opening 18 and being positioned so that the adjacent portions thereof will nearly contact and will provide guide means for reinforcing wires 22.

The reinforcing wires 22 are further guided in an upright path below the rollers 20 and 21 by plates 23 and 24. Situated at the lower ends of the plates 23 and 24 is a horizontal roller 25, and to one side of the roller 25 are brackets 26 for supporting a shaft 27 to carry a roll or spool 28 for the wires 22.

The wires 22 may be individual parallel members or they may be formed into a wire fabric of any woven form, such for instance as chicken wire net. Accordingly, in this disclosure where wires 22 are referred to, it is to be understood that wire fabric also comes within the meaning of the term.

From the roll or spool 28 the wires are conducted horizontally as indicated at 30 to the roller 25 after which they are guided upwardly through the opening 18 and between the rollers 20 and 21. The upper ends 31 of the wires 22 are engaged by a clamping device or gripping device 32 secured to a vertically movable head 33 which is of substantially the same length as the frame structure 11. Means for moving the head 33 upwardly is provided in the form of vertical screws 34, the lower ends of which are mounted in bearings 35, and which screws 34 pass upwardly through threaded bosses 36 in the corners of the head 33 and pass upwardly through bearings 37 in a plate 38 held at a distance above the frame structure 11 by means of posts 40 and reinforcing members 41.

By means of bearing members 42, 43, and 44, as shown in Fig. 1, a drive shaft 45 is secured in a position below the forward end of the plate 38. This drive shaft may be operated from any suitable power source and has a beveled gear 46 thereon engaging a beveled gear 47 on a horizontal shaft 48 which extends under the plate 38 and has on its inner end a beveled gear 50 which engages a beveled gear 51 mounted at the lower end of a vertical shaft 52 which projects vertically through the plate 38. The upper ends of the shafts or screws 34 have beveled gears 53 mounted thereon which engage beveled gears 54 on the outer ends of horizontal diagonally disposed shafts 55 which are respectively supported in bearings 56 mounted in the upper face of the plate 38. On the inner ends of the shafts 55 are beveled gears 57 which engage beveled gears 58 on the vertical shaft 52, thereby providing a geared drive connection from the shaft 45 to the vertical screws 34. Rotation of the screws 34 produces vertical movement of the head 33 and the wires 22 may be thereby drawn or moved vertically upwardly through an upright path which is preferably vertical.

As shown in Fig. 2, the rollers 20 and 21 are mounted in bearings carried by the frame members 12 and 13. The roller 21 has shaft projections 60 and 61 which are carried in stationary bearings 62, and the roller 20 has extending shafts 63 which are received in horizontally adjustable bearing blocks 64 carried in horizontal guides 65 in the frame members 12 and 13. Above the rollers 20 and 21 are rollers 66 and 67 mounted on shafts 68 and 70, the shaft 68 being mounted in longitudinally adjustable bearing blocks 71 carried in the frame members 12 and 13, and the shaft 70 being received in stationary bearings 72. On the forward end of the shaft 70 as shown in Fig. 2 is a beveled gear 73 adapted to be driven by a beveled gear 74 mounted on the lower end of a shaft 75 which extends vertically and has a beveled gear 76 on its upper end engaging a beveled gear 77 on the drive shaft 45. In a bearing 78 a short shaft 79 is mounted below the beveled gear 73, and on its upper end has a beveled gear 80 which engages the beveled gear 73, and on its lower end has a beveled gear 81 adapted to engage a beveled gear 82 on the forwardly projecting end 83 of the forward shaft projections 60 of the roller 21. When the drive shaft 45 is rotated the screws 34, and the rollers 21 and 67 will be driven.

Adjacent to the frame member 13 and the rearward ends of the rollers 20 and 21 is a glass furnace 85 having a melting chamber 86 therein adapted to feed molten glass 87 as indicated in Fig. 3 into molten glass containers or channels 88 which project forwardly from the furnace 85 along the sides of the horizontal wall 17. The containers 88 are preferably of covered construction and may have doors 90 at the ends thereof, and further may be equipped with burners 91 adapted for employment at desired intervals to maintain the glass 87 at a desired temperature, especially during such times as the glass making machine is inoperative.

In the side walls 93 of the containers 88 are horizontal slots or openings 94 through which layers of plastic or molten glass 95 flow, to pass down sloping faces 96 and then flow across the upper face of the horizontal wall structure 17, and then over the rollers 20 and 21 to meet on the upright plane defined by the wires 22. For the purpose of controlling the thickness of the layers 95 adjustable means are employed in conjunction with the longitudinal openings 94 for determining the height of the outer ends of the openings 94. For this purpose I have shown longitudinal strips 97 which are adjustably secured in place by screws or bolts 98. The layers of plastic glass 95 adhere to the opposite sides of and surround the wires 22, and as the wires are moved slowly upwardly a sheet or plate 100 of glass having the wires 22 substantially centrally situated therein is carried upwardly between the rollers 66 and 67. These rollers may or may not be placed to engage the surfaces of the sheet 100, as desired, for if the gauge of the glass is not important the rollers 66 and 67 need not be employed. Also, one or both of the rollers 66 and 67 may have the surfaces thereof engraved to provide figures or designs or chasing on one or both surfaces of the plate 100. The direction of rotation of the rollers 20 and 21 will depend entirely upon the character of work to be performed by the glass making machine. For instance, where a relatively heavy plate 100 is being formed, and the reinforcing wires 22 are relatively heavy, the rollers 20 and 21 may be forced into tight engagement with the wires 22 and driven in such direction that they will move the wires upwardly. Under other conditions of use, such as where a very thin plate 100 is being formed and the reinforcing wires are of small size, the rollers 20 and 21 may be separated, so as not to engage the wires 22 with pressure, and the roller 20 will then be rotated in clockwise direction and the roller 21 will be rotated in anti-clockwise direction, so that the upper faces of the rollers 20 and 21 will act to carry the layers 95 of plastic or molten glass toward the wires 22, and in such use of the machine the plates 97 will be adjusted so as to control the delivery of relatively thin layers 95 of plastic or molten glass. In this second manner of rotating the rollers 20 and 21 the two layers 95 of glass are carried upwardly by the wires 22 as fast as they are fed by the rollers 20 and 21 to engage them with the wires 22.

therefore glass will not be carried downwardly between the rollers. Burner pipes 105 may be placed in horizontal position above the horizontal wall structure 17 so as to provide means for maintaining a desired temperature in the layers of glass 95.

In the use of the machine disclosed herein the reinforcement may be omitted, and plain or non-reinforced sheet glass may be made by securing a leader member in a position depending from the clamp 32, such leader member being of such vertical dimension as to extend down through the rollers 66 and 67 to engage the glass which flows in over the tops of the rollers 20 and 21. A sheet of glass may then be lifted vertically by moving the head 33 upwardly in the manner previously described, and in conjunction with making a sheet of clear, non-reinforced glass the rollers 66 and 67 may or may not be used, in accordance with the requirements of the sheet glass being manufactured.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A sheet glass making machine of the character described, including: a horizontal wall structure having an opening therein; a guide comprising a pair of opposed rollers for directing wires through an upright path through said opening, said rollers being disposed in side-by-side relation in said opening so as to substantially fill the same and so that the upper parts of said rollers form a continuation of the upper face of said horizontal wall structure, the wires passing between said rollers; means engaging the upper ends of said wires for moving them upwardly through said path; and means for feeding plastic glass in layers across the opposing upper faces of said wall structure to the opposite sides of said wires above said opening, such layers uniting at the plane of said wires to form a single sheet of glass with said wires therein, as said wires and said layers are moved upwardly through said path.

2. A sheet glass making machine of the character described, including: a horizontal wall structure having an opening therein; a guide for directing wires through an upright path through said opening; means engaging the upper ends of said wires for moving them upwardly through said path; and a pair of containers for molten glass disposed at the outer edges of said horizontal wall structure, said containers having horizontally elongated discharge gates disposed at planes above said opening, there being sloping walls connecting said gates with the upper face of said horizontal structure for discharging layers of molten glass from said containers across said wall structure to the opposite sides of said wires above said opening, such layers uniting at the plane of said wires to form a single sheet of glass with said wires therein, as said wires and said layers are moved upwardly through said path.

3. A sheet glass making machine of the character described, including: a horizontal wall structure having an opening therein; a guide comprising a pair of opposed rollers for directing wires through an upright path through said opening; means engaging the upper ends of said wires for moving them upwardly through said path; and a pair of containers for molten glass disposed at the outer edges of said horizontal wall structure, said containers having horizontally elongated discharge gates disposed at planes above said opening, there being sloping walls connecting said gates with the upper face of said horizontal structure for discharging layers of molten glass from said containers across said wall structure to the opposite sides of said wires above said opening, such layers uniting at the plane of said wires to form a single sheet of glass with said wires therein, as said wires and said layers are moved upwardly through said path.

4. A sheet glass making machine of the character described, including: a horizontal wall structure having an opening therein; a guide in said opening comprising a pair of opposed rollers for directing wires through an upright path through said opening, said rollers being disposed in side-by-side relation in said opening so as to substantially fill the same and so that the upper parts of said rollers form a continuation of the upper face of said horizontal wall structure, the wires passing between said rollers; means engaging the upper ends of said wires for moving them upwardly through said path; a pair of containers for molten glass disposed at the outer edges of said horizontal wall structure; means for discharging layers of molten glass from said containers across said wall structure to the opposite sides of said wires above said opening, such layers uniting at the plane of said wires to form a single sheet of glass with said wires therein, as said wires and said layers are moved upwardly through said path; and a pair of opposed rollers for forcing said layers together and against said wires.

5. A sheet glass making machine of the character described, including: a horizontal wall structure having an opening therein; a pair of guide rollers for directing wires through an upright path through said opening, said rollers being disposed in side-by-side relation in said opening so as to substantially fill the same and so that the upper parts of said rollers form a continuation of the upper face of said horizontal wall structure, the wires passing between said rollers; means engaging the upper ends of said wires for moving them upwardly through said path; a glass furnace disposed adjacent one end of said guide means; a pair of channel-like containers for molten glass extending forwardly from said furnace along the outer edges of said horizontal wall structure; and means for discharging layers of molten glass from said containers across said wall structure to the opposite sides of said wires above said opening, such layers uniting at the plane of said wires to form a single sheet of glass with said wires therein, as said wires and said layers are moved upwardly through said path.

6. A sheet glass making machine of the character described, including: a horizontal wall structure having an opening therein; a guide in said opening comprising a pair of opposed rollers for directing wires through an upright path through said opening, said rollers being disposed in side-by-side relation in said opening so as to substantially fill the same and so that the upper parts of said rollers form a continuation of the upper face of said horizontal wall structure, the wires passing between said rollers; means engaging the upper ends of said wires for moving them upwardly through said path; a glass furnace disposed adjacent one end of said guide means; a pair of channel-like containers for molten glass extending forwardly from said furnace along the outer edges of said horizontal wall structure; means for discharging layers of molten glass from said containers across said wall structure to the opposite sides of said wires above said opening, such layers uniting at the plane of said wires to form a single sheet of glass with said wires therein, as said wires and said layers are moved upwardly through said path; and a pair of opposed rollers engaging the sides of said sheet of glass.

7. A sheet glass making machine of the character described, including: a horizontal wall structure having an opening therein; a pair of guide rollers for directing wires through an upright path through said opening, said rollers being disposed in side-by-side relation in said opening so as to substantially fill the same and so that the upper parts of said rollers form a continuation of the upper face of said horizontal wall structure, the wires passing between said rollers; a vertically movable head having means for engaging the upper ends of said wires; means for moving said head upwardly at a controlled speed so as to move said wires upwardly through said path; and means for feeding plastic glass in layers across the opposing upper faces of said wall structure to the opposite sides of said wires above said opening, such layers uniting at the plane of said wires to form a single sheet of glass with said wires therein, as said wires and said layers are moved upwardly through said path.

8. A sheet glass making machine of the character described, including: a horizontal wall structure having an opening therein; a pair of guide rollers for directing wires through an upright path through said opening, said rollers being disposed in side-by-side relation in said opening so as to substantially fill the same and so that the upper parts of said rollers form a continuation of the upper face of said horizontal wall structure, the wires passing between said rollers; a vertically movable head having means for engaging the upper ends of said wires; means for moving said head upwardly at a controlled speed so as to move said wires upwardly through said path; a pair of containers for molten glass disposed at the outer edges of said horizontal wall structure; and means for discharging layers of molten glass from said containers across said wall structure to the opposite sides of said wires above said opening, such layers uniting at the plane of said wires to form a single sheet of glass with said wires therein, as said wires and said layers are moved upwardly through said path.

9. A sheet glass making machine of the character described, including: a horizontal wall structure having an opening therein; a guide comprising a pair of opposed rollers for directing wires through an upright path through said opening, said rollers being disposed in side-by-side relation in said opening so as to substantially fill the same and so that the upper parts of said rollers form a continuation of the upper face of said horizontal wall structure, the wires passing between said rollers; a vertically movable head having means for engaging the upper ends of said wires; means for moving said head upwardly at a controlled speed so as to move said wires upwardly through said path; a pair of containers for molten glass disposed at the outer edges of said horizontal wall structure; means for discharging layers of molten glass from said containers across said wall structure to the opposite sides of said wires above said opening, such layers uniting at the plane of said wires to form a single sheet of glass with said wires therein, as said wires and said layers are moved upwardly through said path; and a pair of opposed rollers for engaging the sides of said sheet of glass.

EDWARD B. HUNTER.